US007847461B2

(12) United States Patent
Rahman et al.

(10) Patent No.: US 7,847,461 B2
(45) Date of Patent: Dec. 7, 2010

(54) MULTI-LAYER MAGNET ARRANGEMENT IN A PERMANENT MAGNET MACHINE FOR A MOTORIZED VEHICLE

(75) Inventors: Khwaja M. Rahman, Troy, MI (US); Edward L. Kaiser, Rochester Hills, MI (US); Matthew D. Laba, Oakland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 47 days.

(21) Appl. No.: 11/758,923

(22) Filed: Jun. 6, 2007

(65) Prior Publication Data

US 2008/0303368 A1     Dec. 11, 2008

(51) Int. Cl.
 *H02K 21/12* (2006.01)
(52) U.S. Cl. ............... 310/156.56; 310/156.23; 310/156.83; 310/156.43; 310/154.21; 310/52; 310/54
(58) Field of Classification Search .......... 310/156, 310/156.23, 154; *H02K 21/12*
See application file for complete search history.

(56) References Cited

U.S. PATENT DOCUMENTS

| | | | | | |
|---|---|---|---|---|---|
| 3,292,023 | A | * | 12/1966 | Kober | 310/156.75 |
| 4,110,718 | A | * | 8/1978 | Odor et al. | 335/296 |
| 6,329,734 | B1 | * | 12/2001 | Takahashi et al. | 310/156.56 |
| 6,359,359 | B1 | * | 3/2002 | Miura et al. | 310/156.43 |
| 6,533,692 | B1 | * | 3/2003 | Bowen | 475/5 |
| 6,630,762 | B2 | * | 10/2003 | Naito et al. | 310/156.53 |
| 6,668,954 | B2 | * | 12/2003 | Field | 180/65.23 |
| 7,151,335 | B2 | * | 12/2006 | Tajima et al. | 310/156.48 |
| 7,385,328 | B2 | * | 6/2008 | Melfi | 310/156.45 |
| 2001/0043020 | A1 | * | 11/2001 | Nishiyama et al. | 310/156.01 |
| 2002/0041127 | A1 | * | 4/2002 | Naito et al. | 310/156.07 |
| 2002/0121827 | A1 | * | 9/2002 | Kaneko et al. | 310/156.43 |
| 2005/0187671 | A1 | * | 8/2005 | Nada | 701/1 |
| 2005/0205313 | A1 | * | 9/2005 | Gilmore et al. | 180/65.2 |
| 2006/0103251 | A1 | * | 5/2006 | Taniguchi et al. | 310/156.01 |

(Continued)

FOREIGN PATENT DOCUMENTS

CN    1933286 A    3/2007

(Continued)

OTHER PUBLICATIONS

Brokem_magnet2.pdf : NPL information from http://www.madsci.org/posts/archives/2000-04/955645357.Ph.r.html, 2000.*

(Continued)

*Primary Examiner*—Quyen Leung
*Assistant Examiner*—John K Kim
(74) *Attorney, Agent, or Firm*—Ingrassia Fisher & Lorenz, P.C.

(57) ABSTRACT

A permanent magnet machine includes a stator having a hollow core, a rotor rotatably disposed inside the hollow core, and a plurality of multilayered permanent magnets embedded in the rotor. Each multilayered permanent magnet has opposite first and second ends, and includes a first magnet disposed at the first end, and a second magnet disposed at the second end and coupled to the first magnet. The second magnet has higher magnet strength than the first magnet, and also has lower high-temperature stability than the first magnet.

18 Claims, 4 Drawing Sheets

U.S. PATENT DOCUMENTS

| | | | |
|---|---|---|---|
| 2006/0175996 A1* | 8/2006 | Tether | 318/376 |
| 2007/0093359 A1* | 4/2007 | Kobayashi et al. | 477/107 |
| 2007/0108861 A1* | 5/2007 | Aoyama | 310/156.38 |
| 2007/0138893 A1* | 6/2007 | Son | 310/156.83 |
| 2007/0159021 A1* | 7/2007 | Horst | 310/156.53 |
| 2007/0228862 A1* | 10/2007 | Welchko et al. | 310/156.53 |
| 2007/0284960 A1* | 12/2007 | Fulton et al. | 310/156.53 |
| 2008/0303368 A1* | 12/2008 | Rahman et al. | 310/156.56 |

FOREIGN PATENT DOCUMENTS

| | | |
|---|---|---|
| JP | 10271722 A | 10/1998 |
| JP | 11103547 A | 4/1999 |
| JP | 2004328819 A | 11/2004 |
| WO | 2007146208 A1 | 12/2007 |

OTHER PUBLICATIONS

Nasar_1993.pdf : Nasar et al, "Permanent Magnet, Reluctance, and Self Synchronous Motors", 1993.*

Demag_Miller.pdf : Miller et al, 'Interactive Computer Aided Design of Permanent Magnet DC Motors', IEEE Transaction, Jul.-Aug. 1995.*

Chinese Office Action issued on Mar. 11, 2010, for Application No. 200810109626, filed on Jun. 6, 2008.

* cited by examiner

PRIOR ART

MULTI-LAYER MAGNET ARRANGEMENT IN A PERMANENT MAGNET MACHINE FOR A MOTORIZED VEHICLE

TECHNICAL FIELD

The present invention generally relates to permanent magnet machines used in motors, and more particularly relates to motorized vehicles that incorporate permanent magnet machines.

BACKGROUND OF THE INVENTION

A permanent magnet machine includes a rotor having a core that supports mounted permanent magnets. The rotor is surrounded by a stator that includes static coils. Interaction of a winding magneto motive force, (MMF) produced by the static coils, with the permanent magnets generates a rotary driving force. Based on how the permanent magnets are mounted, permanent magnet motors are classified as either surface-mounted permanent magnet motors or embedded permanent magnet motors. The embedded permanent magnet motor includes a plurality of permanent magnets mounted in the rotor core, while the surface-mounted permanent magnet motor includes permanent magnets mounted on the rotor core surface. The embedded permanent magnet motor is consequently used when high speed rotation is needed. Furthermore, the embedded permanent magnet machine has favorable characteristics such as good high speed power and efficiency and low spin loss, which makes the machine favorable for many applications including hybrid and fuel cell electric vehicle applications.

FIG. 1 is a cross-sectional view depicting a conventional embedded permanent magnet motor 10. The motor 10 is further classified as a concentrated winding motor since it includes concentrated pairs of coils in a stator that is disposed about the rotor. This is in contrast to a coil distribution motor in which coils are evenly distributed in a stator. The motor 10 includes a stator 11 on which coils 20 are wound, and a rotor 14 rotatably disposed within the stator 11.

The stator 11 includes a stator body 12 that is formed by stacking a plurality of magnetic steel sheets that, when stacked, together form the shape of a cylinder having a hollow core. A plurality of slots 13 are formed in the stator body 12 and are arranged in a circumferential arrangement to support the coils 20 therein. The stator body also includes a plurality of teeth 19 that are disposed alongside the slots 13.

The rotor 14 includes a rotor core 15 that is formed by stacking a plurality of magnetic steel sheets that, when stacked, together form the shape of a cylinder. The rotor core 15 is disposed in the stator body hollow core, while being spaced a predetermined distance from the stator body 12 so that a gap 21 is formed between the stator body 12 and the rotor core 15. A plurality of insertion holes 16 are formed in the rotor core 15 and are arranged in a circumferential arrangement to support a plurality of permanent magnets 17 that are inserted therein. A rotary shaft 18 is inserted in a hollow region formed at the center of the rotor 14, which rotates together with the rotary shaft 18.

When electric current is supplied to the coils 20 wound on the slots 13 of the stator 11, polarities of the coils are sequentially changed. A rotary magnetic field is consequently generated at the stator teeth 19 and a magnetic field is further generated at the rotor 14 in which the permanent magnets 17 are embedded. The magnetic field of the rotor 14 follows the rotary magnetic field generated at the stator teeth 19. As a result rotation of the rotor 14 generates a rotary driving force.

Elevated operating temperature environments for permanent magnet motors in automobiles, and particularly for hybrid applications, along with a high demagnification field that exists during machine operation, makes the permanent magnet motors vulnerable to demagnetization. To prevent demagnetization, high temperature magnets are frequently selected in permanent magnet motors when the machine is operated at high temperatures. However, for high energy rare earth magnets such as neodymium iron boron or samarium cobalt magnets, the magnet strength reduces as the operational temperature increases. Consequently, designers often choose a lower strength magnet that can withstand the demagnetization field that exists at elevated temperatures.

Accordingly, it is desirable to provide a permanent magnet that has high strength properties. In addition, it is desirable to provide a permanent magnet that is capable of withstanding the demagnetization field existing in the operating environment of a permanent magnet motor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

According to one embodiment of the invention, a permanent magnet machine is provided that includes a stator having a hollow core, a rotor rotatably disposed inside the hollow core, and a plurality of multilayered permanent magnets embedded in the rotor. Each multilayered permanent magnet has opposite first and second ends, and includes a first magnet disposed at the first end, and a second magnet disposed at the second end and coupled to the first magnet. The second magnet has higher magnet strength than the first magnet, and also has lower high-temperature stability than the first magnet.

According to another embodiment of the invention, a permanent magnet for a permanent magnet machine is provided. The permanent magnet has opposite first and second ends, and includes a first magnet disposed at the first end, and a second magnet disposed at the second end and coupled to the first magnet. The second magnet has higher magnet strength than the first magnet, and also has lower high-temperature stability than the first magnet.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
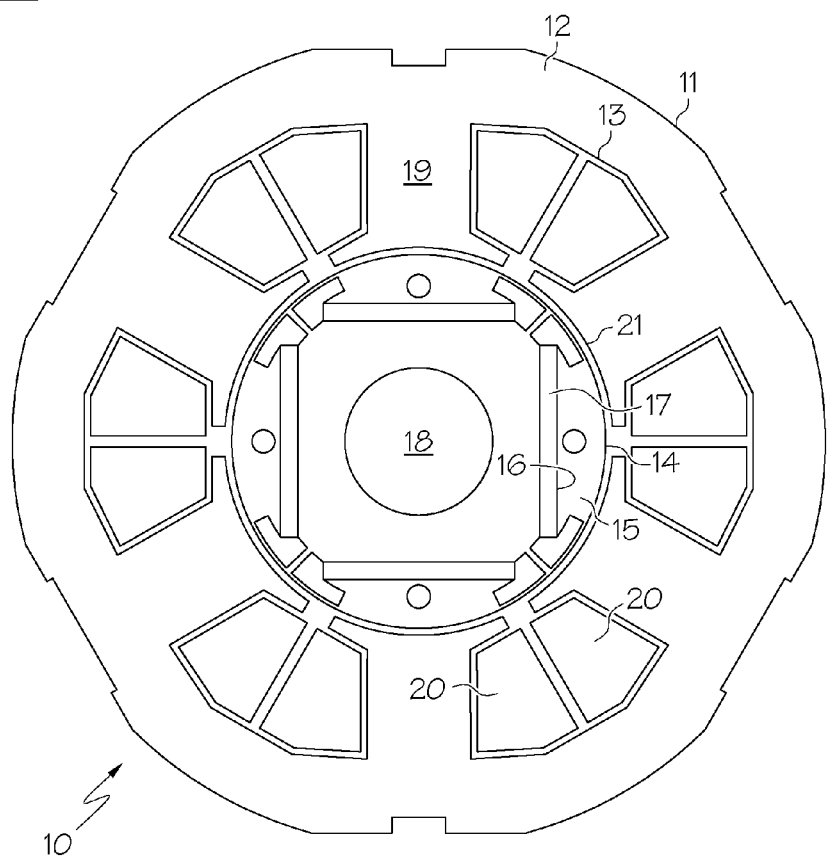
FIG. 1 is a cross-sectional view depicting a conventional embedded permanent magnet motor.
Figure 2:
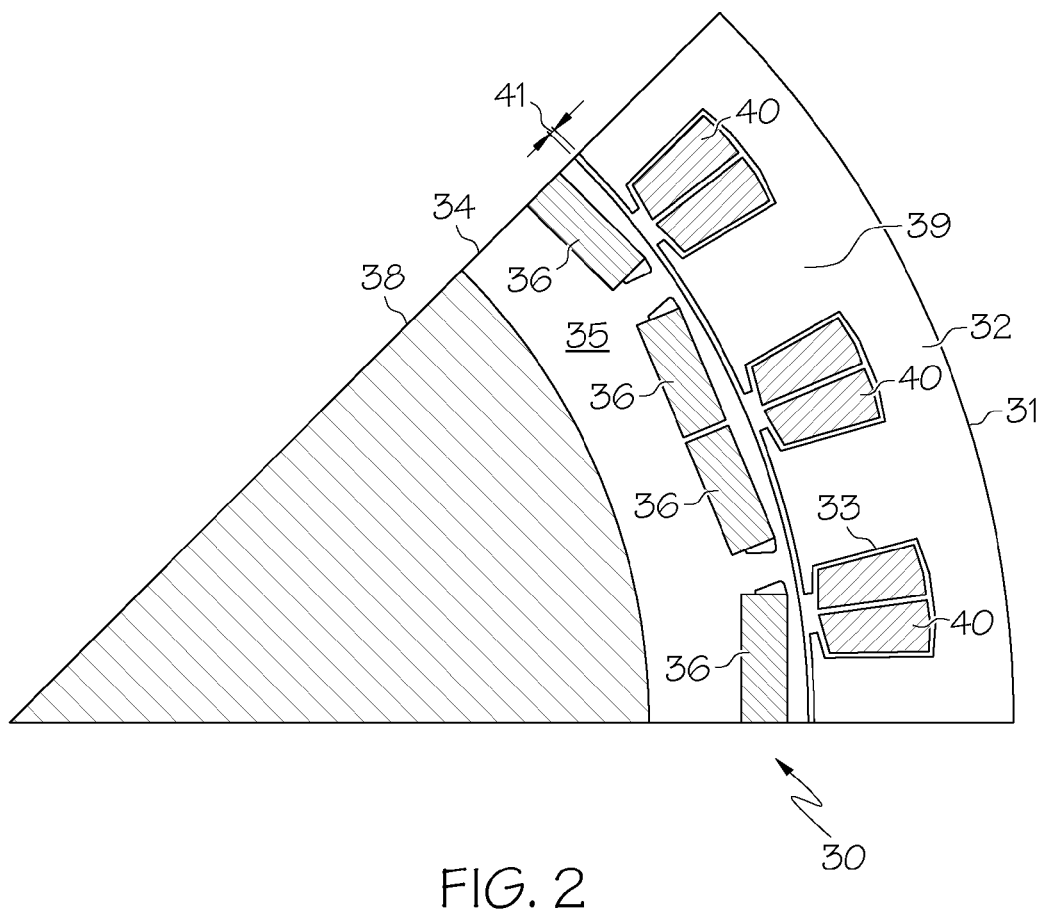
FIG. 2 is a partial cross-sectional view depicting a permanent magnet machine incorporating multi-layered magnets according to an embodiment of the invention.

Turning now to FIG. 2, a partial cross-sectional view is depicted of an embedded permanent magnet machine 30, which may be a component of various automobile components such as a transmission of a hybrid vehicle or a traction system for a fuel cell electric or purely electric vehicle. The permanent magnet machine 30 may also be used in high temperature applications unrelated to motor vehicles. Embodiments that incorporate the principles of the invention include both embedded and surface-mounted permanent magnet machines, of either the concentrated or distributed winding variety. Furthermore, an inside out machine in which the rotor is disposed and rotates around a stator may incorporate the principles of the invention.

The permanent magnet machine 30 in FIG. 2 includes a stator 31 that includes a plurality of teeth 39 on which coils 40 are wound. A rotor 34 is rotatably disposed within the stator 31. The stator 31 includes a hollow and substantially cylindrical stator lamination 32. The stator 31 may be formed by stacking a plurality of magnetic steel sheets that, when stacked and laminated, together form the shape of a cylinder having a hollow core. The teeth 39 are formed in a circumferential arrangement, with slots 33 formed between the teeth 39 to support the coils 40 therein. According to an exemplary embodiment, the machine sheet depicted in FIG. 2 has a periodicity of eight, hence only one eighth of the geometry is depicted.

The rotor 34 includes a hollow, substantially cylindrical rotor core 35. The rotor 34 may be formed by stacking a plurality of magnetic steel sheets that, when stacked, together form the shape of a cylinder. The rotor core 35 is disposed in the stator hollow core, while being spaced a predetermined distance from the stator lamination 32 so that a gap 41 is formed between the stator lamination 32 and the rotor core 35. A plurality of insertion holes are formed in the rotor core 35 and are arranged in a circumferential arrangement to support a plurality of permanent magnets 36 that are embedded in the rotor core 35. Exemplary permanent magnets 36 are rare earth magnets such as neodymium iron boron or samarium cobalt magnets, although ferrite, ceramic, and alnico magnets may be used for other embodiments according to design requirements. A rotary shaft 38 is inserted in a hollow region formed at the center of the rotor 34, which rotates together with the rotary shaft 38.

A permanent magnet machine is often favored over other machines such as induction, synchronous, or switched reluctance machines due to its relatively high torque and power density, and its superior efficiency. However, as previously discussed, there is a risk of demagnetization of the permanent magnets in many applications, such as hybrid or fuel cell vehicle applications, due to the presence of high temperatures and a strong demagnetization field. For this reason, magnets that are durable in high temperatures are used in the permanent magnet machines. However, for rare earth magnets, which are frequently selected for their high energy, the magnet strength is inversely proportional to its ability to stably withstand high temperatures. In the magnet product lines, the higher temperature magnets typically have lower magnetic strength, which in a permanent magnet machine produces reduced torque. The high temperature magnets with sufficient magnet strength are generally more expensive than lower temperature magnets. Also, there is only a small selection of high temperature magnets that also have sufficient magnet strength.

Figure 3:
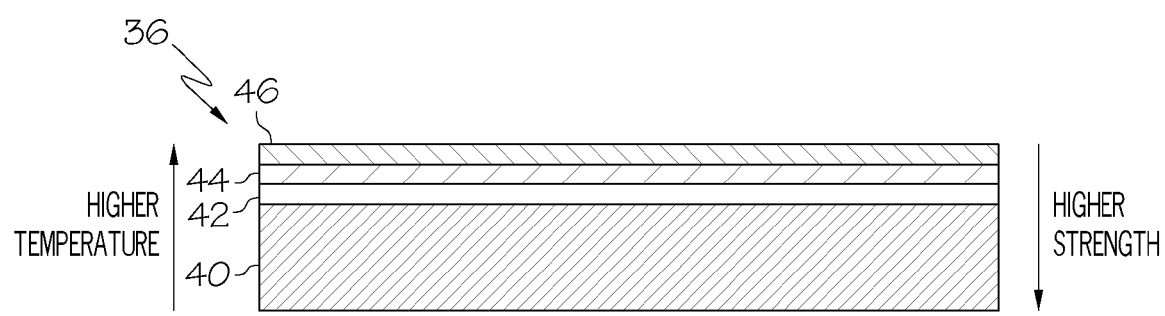
FIG. 3 is a cross-sectional view of a multi-layered magnet having horizontal layering according to an embodiment of the invention.

The present invention enables use of permanent magnets having widely ranging magnet strengths and temperature grades, while meeting or surpassing the demagnetizing performance capabilities and magnetic strength of higher cost, high temperature grade magnets. Turning now to FIG. 3, a cross-sectional view of a multi-layered magnet 36 having horizontal layering is depicted according to an embodiment of the invention. As will be explained, the magnetic layering enables the use of a plurality of magnets having different magnet strengths and temperature grades as a single permanent magnet 36. The plurality of magnets is joined using, for example, a suitable adhesive composition. The layering and adhesion of the magnets may be performed by compiling pre-manufactured magnets, or during the original magnet manufacturing process. Magnet layering may be either horizontal or vertical depending on the permanent magnet arrangement and position with respect to the surrounding stator and the coils incorporated therein. For the specific machine geometry depicted in FIG. 2, the permanent magnet 36 preferably has a horizontal layering arrangement, although vertical layered magnets are suitable for other embodiments as will be subsequently described.

Magnets are layered in the permanent magnet 36 based on the magnitude of the demagnetizing field in areas surrounding the permanent magnet 36 during operation. The permanent magnet surface that is close to the air gap 41 is subjected to a relatively high demagnification field, while the bulk of the permanent magnet 36 that is disposed away from the air gap 41 does not experience a very high demagnetizing field and is therefore not vulnerable to demagnification. Also, the permanent magnet 36 and any surrounding iron lamination near the rotor surface experiences a large amount of flux variation, and consequently experiences a relatively high amount of eddy losses that result in high temperatures.

Referring to FIG. 3, the permanent magnet according to one embodiment includes at least two magnet layers. A magnet 40 having relatively high magnet strength is a lower layer that will be positioned largely in regions that do not experience a high demagnetizing field. Thus, in the embodiment depicted in FIG. 2, the highest magnet strength magnet 40 is the component of the permanent magnet 36 that is situated farthest from the air gap 41. In an exemplary embodiment, the high magnet strength magnet 40 is at least half of the permanent magnet mass. A magnet 46 that is more capable of stably withstanding a high demagnetizing field under elevated temperature is an upper layer that will be positioned in regions that experience a high demagnetizing field. Thus, in the embodiment depicted in FIG. 2, the highest temperature magnet, having the highest demagnetization strength, is the component of the permanent magnet 36 that is situated closest to the air gap 41. Intermediate magnets 42 and 44 may also be included in the permanent magnet 36, with each sequentially upwardly-disposed magnet having higher temperature properties, and hence higher demagnetization strength, and each sequentially downwardly-disposed magnet having higher magnet strength, and a lower temperature grade.

Figure 4:
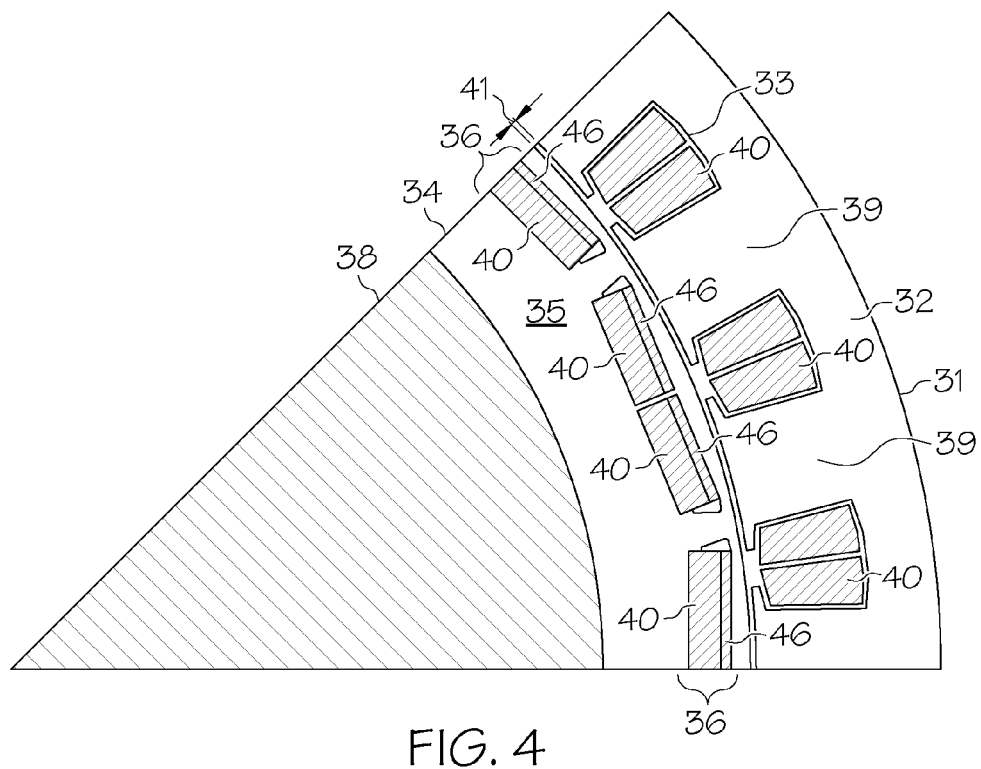
FIG. 4 is a partial cross-sectional view depicting the permanent magnet machine depicted in FIG. 2, including a detailed view of dual-layered magnets incorporated therein according to an embodiment of the invention.

FIG. 4 is a partial cross-sectional view depicting the permanent magnet machine depicted in FIG. 2, including a detailed view of dual-layered magnets incorporated therein. The high magnet strength (low temperature grade) magnet 40 is the bulk of the permanent magnet mass, and is disposed away from the air gap 41. The high temperature magnet 46 is disposed close to the air gap where the highest demagnetization field produced. According to just one exemplary embodiment, the permanent magnet 36 has a thickness of 6 mm. The high magnet strength magnet 40 is 4 mm thick, while the high temperature magnet is 2 mm thick. Some exemplary high temperature magnets that may be used include the 36Z magnet produced by ShinEtsu Chemical Co., Ltd., and the HS 40-FH magnet produced by Hitachi Metals, Ltd. Some exemplary high magnetic strength magnets include the 41TU and 43TS magnets produced by ShinEtsu Chemical Co., Ltd., and the HS 43-EH or 47-DH magnets produced by Hitachi Metals, Ltd. The 41TU and 43TS magnets are lower temperature magnets than the 36Z magnet, but have higher magnetic strength. Likewise, the HS 43-EH and 47-DH magnets are lower temperature magnets than the HS 40-FH magnet, but has higher magnetic strength.

Examining a flux density plot for a magnet for selected operating conditions, and then comparing the flux density with the B-H curve for a magnet, will provide a representation of the magnet's durability and propensity to be demagnetized during operation. For example, in a concentrated winding permanent magnet machine having the configuration represented in FIG. 4 and including sixteen rotor poles and twenty-four stator slots, it can be determined that a high temperature 36Z magnet has sufficient demagnetization potential to be used as the closest magnet 46 to the air gap 41. Furthermore, even though an analysis of the second quadrant of the B-H curves for the high magnet strength magnets 41TU and 43TS reveals a high risk for demagnetization if they are positioned closest to the air gap 41, one or both may be used as a magnet 40 that is farther from the air gap without risk of demagnetization under normal operating conditions. Since magnets 41TU and 43TS have high magnet strength, the relatively low strength, high temperature magnet 36Z does not adversely affect the overall strength of the permanent magnet 36. Also, when compared with a permanent magnet machine incorporating a high magnet strength, high temperature magnet such as the HS 40-FH, an identical permanent magnet machine that instead incorporates a multiple-layered permanent magnet such as the 36Z and either 41TU or 43TS magnet improved machine torque.

Figure 5:
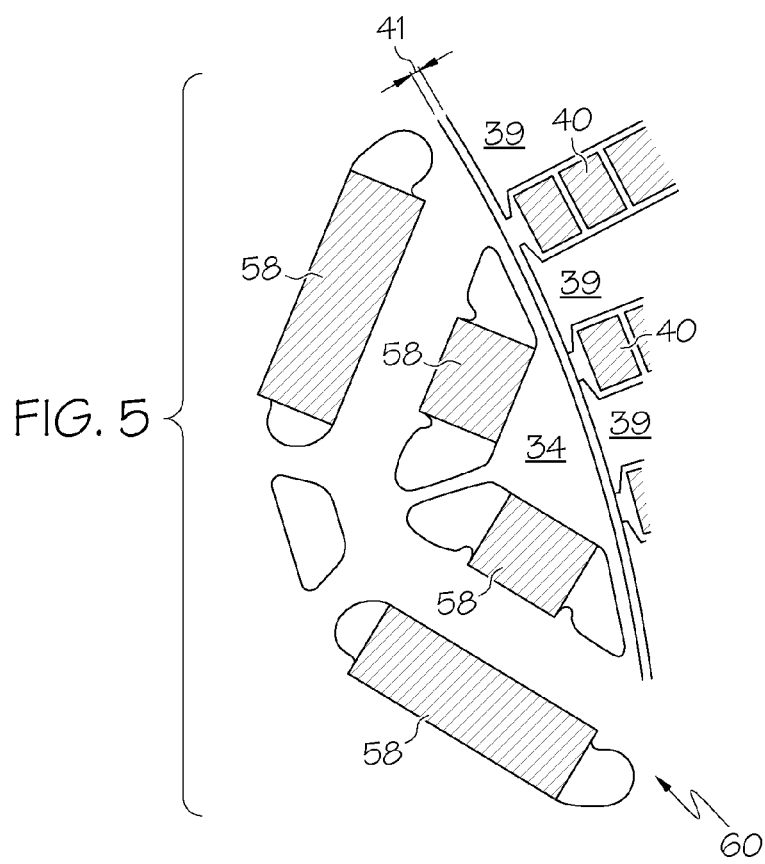
FIG. 5 is a partial cross-sectional view depicting a permanent magnet machine incorporating multi-layered magnets according to another embodiment of the invention.
Figure 6:
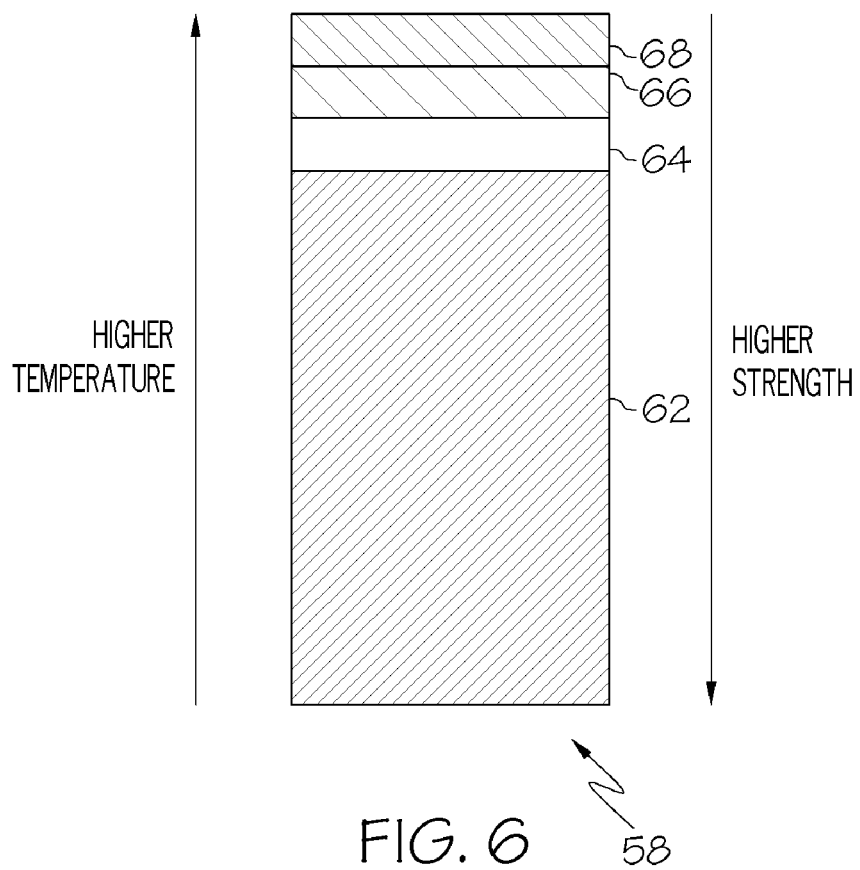
FIG. 6 is a cross-sectional view of a multi-layered magnet having vertical layering according to an embodiment of the invention.

Turning now to FIG. 5, a partial cross-sectional view depicts a permanent magnet machine 60 incorporating multi-layered magnets according to another embodiment of the invention. The permanent machine 60 has a different coil arrangement in the stator 31 and a different permanent magnet arrangement than the machine depicted in FIG. 2. Specifically, the rotor 34 includes an arrangement of permanent magnets 58 that are tilted with one corner much closer to the air gap 41 than any other corner. For such an arrangement, multilayered permanent magnets having vertical layering instead of horizontal layering may provide better machine torque, magnet strength, and/or high temperature stability. FIG. 6 is a cross-sectional view of a multi-layered permanent magnet 58 having vertical layering for use in the machine depicted in FIG. 6, for example. The permanent magnet includes at least two magnet layers. A magnet 62 having relatively high magnet strength, and hence having a lower temperature grade, is a lower layer that will be positioned largely in regions that do not experience a high demagnetization field during high operating temperatures. Thus, in the embodiment depicted in FIG. 5, the highest magnet strength magnet 62 is the component of the permanent magnet 58 that is situated farthest from the air gap 41. In an exemplary embodiment, the high magnet strength magnet 62 is at least half of the permanent magnet mass. A magnet 68 that is more capable of stably withstanding a high demagnetizing field at an elevated temperature is an upper layer that will be positioned in regions that experience a high demagnetizing field. Thus, in the embodiment depicted in FIG. 5, the highest temperature magnet 68 is the component of the permanent magnet 58 that forms the corner that is situated closest to the air gap 41. Intermediate magnets 64 and 66 may also be included in the permanent magnet 58, with each sequentially upward disposed magnet having higher temperature properties, and each sequentially downward magnet having higher magnet strength.

Figure 7:
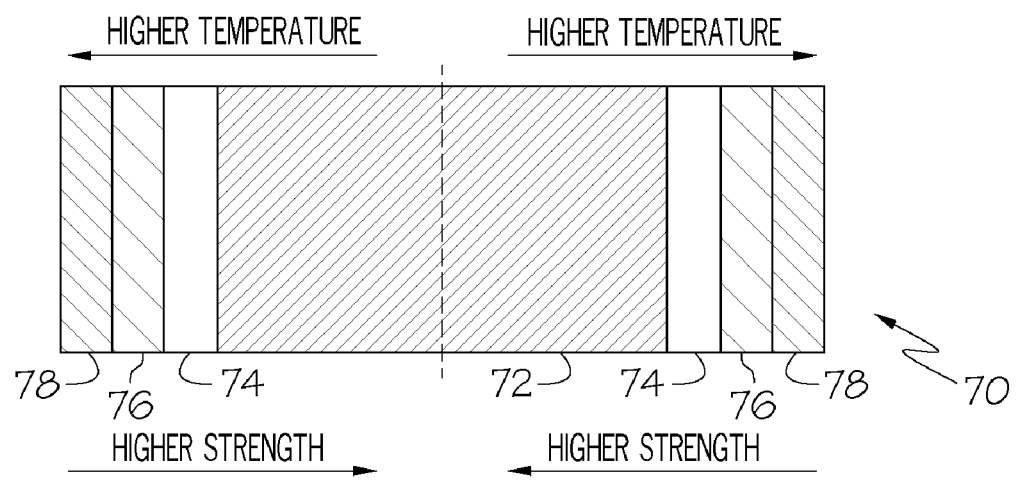
FIG. 7 is a cross-sectional view of a multi-layered magnet having horizontal layering at opposite ends thereof according to an embodiment of the invention.

Another exemplary permanent magnet 70 having a vertical layered configuration is depicted in FIG. 7. The permanent magnet 70 may be incorporated into the permanent magnet machine depicted in FIG. 2 in place of the depicted permanent magnets 36. Since such magnets have two corners that are relatively close to the air gap 41, the permanent magnet 70 includes identical or different high temperature magnets 78 at opposite ends. A magnet 72 having relatively high magnet strength is a middle layer that will be positioned largely in regions that do not experience a relatively high demagnetizing field. Thus, in the embodiment depicted in FIG. 2, the highest magnet strength magnet 72 is the component of the permanent magnet 36 that is situated farthest from the air gap 41. In an exemplary embodiment, the high magnet strength magnet 72 is at least half of the permanent magnet mass. Intermediate magnets 74 and 76 may also be included in the permanent magnet 70, with each sequentially outwardly disposed magnet having higher temperature properties, and each sequentially inward magnet having higher magnet strength.

While several exemplary embodiments have been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A permanent magnet machine, comprising:
a stator having a hollow core;
a rotor rotatably disposed inside the hollow core;
an air gap disposed between the stator and the rotor; and
a plurality of multilayered permanent magnets embedded in the rotor, each multilayered permanent magnet having opposite first and second ends, the first end of each multilayered permanent magnet being positioned closer than the second end to the air gap, and each multilayered permanent magnet comprising:
a first magnet disposed at the first end, and
a second magnet disposed at the second end and coupled to the first magnet, the second magnet having higher magnet strength than the first magnet, and also having lower high-temperature stability than the first magnet.

2. The permanent magnet machine according to claim 1, wherein the magnets in at least one of the multilayered permanent magnets are joined using an adhesive composition.

3. The permanent magnet machine according to claim 1, wherein at least one of the multilayered permanent magnets further comprises at least one intermediate magnet disposed between the first and second magnets, wherein the first magnet, second magnet, and at least one intermediate magnet are arranged from the first end to the second end to have increasingly higher magnet strength.

4. The permanent magnet machine according to claim 1, wherein at least one of the multilayered permanent magnets further comprises at least one intermediate magnet disposed between the first and second magnets, wherein the first magnet, second magnet, and at least one intermediate magnet are arranged from the second end to the first end to have increasingly higher high-temperature stability.

5. The permanent magnet machine according to claim 1, wherein the plurality of multilayered permanent magnets have a vertically layered arrangement.

6. The permanent magnet machine according to claim 1, wherein the plurality of multilayered permanent magnets have a horizontally layered arrangement.

7. The permanent magnet machine according to claim 1, wherein the second magnet, having higher magnet strength than the first magnet, is at least half of the permanent magnet mass.

8. An automobile comprising:
a permanent magnet machine, the permanent magnet machine comprising:
a stator having a hollow core;
a rotor rotatably disposed inside the hollow core;
an air gap disposed between the stator and the rotor; and
a plurality of multilayered permanent magnets embedded in the rotor, each multilayered permanent magnet having opposite first and second ends, the first end of each multilayered permanent magnet being disposed closer than the second end to the air gap, and each multilayered permanent magnet comprising:
a first magnet disposed at the first end, and
a second magnet disposed at the second end and coupled to the first magnet, the second magnet having higher magnet strength than the first magnet, and also having lower high-temperature stability than the first magnet; and
a motor coupled to the permanent magnet machine.

9. The automobile according to claim 8, wherein the automobile comprises a hybrid vehicle transmission, and the permanent magnet machine is a component of the hybrid vehicle transmission.

10. The automobile according to claim 8, wherein the automobile comprises a fuel cell traction system, and the permanent magnet machine is a component of the fuel cell traction system.

11. The automobile according to claim 8, wherein the automobile comprises an electric motor, and the permanent magnet machine is a component of the electric motor.

12. A permanent magnet for a permanent magnet machine, the permanent magnet comprising:
a first end and a second end;
a first magnet disposed at the first end;
a second magnet disposed at the second end, the second magnet having higher magnet strength than the first magnet, and also having lower high-temperature stability than the first magnet; and
an intermediate magnet disposed between the first and second magnets, wherein the intermediate magnet has higher magnet strength than the first magnet and lower magnet strength than the second magnet.

13. The permanent magnet according to claim 12, wherein the magnets in the permanent magnet are joined using an adhesive composition.

14. The permanent magnet according to claim 12, further comprising at least one intermediate magnet disposed between the first and second magnets, wherein the first magnet, second magnet, and at least one intermediate magnet are arranged from the second end to the first end to have increasingly higher high-temperature stability.

15. The permanent magnet according to claim 12, wherein the permanent magnet has a vertically layered arrangement.

16. The permanent magnet according to claim 12, wherein the permanent magnet has a horizontally layered arrangement.

17. The permanent magnet according to claim 12, wherein the second magnet, having higher magnet strength than the first magnet, is at least half of the permanent magnet mass.

18. The automobile according to claim 8, wherein each multilayered permanent magnet further comprises:
an intermediate magnet disposed between the first and second magnets, wherein the intermediate magnet has higher magnet strength than the first magnet and lower magnet strength than the second magnet.

* * * * *